(12) United States Patent
Song et al.

(10) Patent No.: US 11,972,252 B2
(45) Date of Patent: Apr. 30, 2024

(54) DOCKER INSTALLED SOFTWARE/HARDWARE DISCOVERY

(71) Applicant: MICRO FOCUS LLC, Santa Clara, CA (US)

(72) Inventors: Qiuxia Song, Shanghai (CN); Yi-Ming Chen, Shanghai (CN); Zhong-Yi Yang, Shanghai (CN); Yangyang Zhao, Shanghai (CN); Lei Xiao, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 125 days.

(21) Appl. No.: 17/391,903

(22) Filed: Aug. 2, 2021

(65) Prior Publication Data
US 2023/0037382 A1 Feb. 9, 2023

(51) Int. Cl.
*G06F 8/61* (2018.01)
*G06F 8/65* (2018.01)
(Continued)

(52) U.S. Cl.
CPC ............... *G06F 8/70* (2013.01); *G06F 21/44* (2013.01); *G06F 8/24* (2013.01); *G06F 8/60* (2013.01);
(Continued)

(58) Field of Classification Search
CPC .. G06F 9/44578; G06F 9/45558; G06F 9/546; G06F 9/455; G06F 9/5077; G06F 9/5083; G06F 9/505; G06F 11/1464; G06F 11/3433; G06F 11/1425; G06F 11/1433; G06F 21/44; G06F 21/577; G06F 21/53; G06F 21/566; G06F 21/564;
(Continued)

(56) References Cited

U.S. PATENT DOCUMENTS 10,333,981 B2 6/2019 Lee et al.
10,546,124 B2 1/2020 Wiest et al.
(Continued)

FOREIGN PATENT DOCUMENTS

CN 109918911 B 11/2020

OTHER PUBLICATIONS

Kelly Brady et al., Docker Container Security in Cloud Computing, 2020 IEEE, [Retrieved on Nov. 29, 2023]. Retrieved from the internet: <URL: https://ieeexplore.ieee.org/stamp/stamp.jsp?tp=&arnumber=9031195> 6 Pages (0975-0980) (Year: 2020).*
(Continued)

*Primary Examiner* — Anibal Rivera
(74) *Attorney, Agent, or Firm* — Sheridan Ross P.C.

(57) ABSTRACT

A docker image is received. The docker image is for a container. The container contains files that allow for virtualization of applications that run within the container. The docker image is parsed to identify layer files in the docker image. Installed software components (e.g., installed files) and/or hardware components in the layer files are identified. Software application index calls are made to generate information that identifies relationships between the installed software components and/or hardware components. The relationships between the installed software components and/or hardware components are then displayed to a user.

20 Claims, 5 Drawing Sheets

(51) Int. Cl.
*G06F 8/70* (2018.01)
*G06F 8/71* (2018.01)
*G06F 21/44* (2013.01)
*G06F 8/20* (2018.01)
*G06F 8/60* (2018.01)
*G06F 8/656* (2018.01)
*G06F 21/53* (2013.01)
*G06F 21/56* (2013.01)
*G06F 21/57* (2013.01)
*H04L 9/40* (2022.01)

(52) U.S. Cl.
CPC .............. *G06F 8/63* (2013.01); *G06F 8/656* (2018.02); *G06F 8/71* (2013.01); *G06F 21/53* (2013.01); *G06F 21/562* (2013.01); *G06F 21/564* (2013.01); *G06F 21/566* (2013.01); *G06F 21/577* (2013.01); *H04L 63/1433* (2013.01); *H04L 63/20* (2013.01)

(58) Field of Classification Search
CPC .......... G06F 21/562; G06F 21/55; G06F 8/70; G06F 8/63; G06F 8/656; G06F 8/71; G06F 8/60; G06F 8/24; H04L 63/20; H04L 63/1433; H04L 63/08
See application file for complete search history.

(56) References Cited

U.S. PATENT DOCUMENTS

| | | | |
|---|---|---|---|
| 10,635,406 B2 | 4/2020 | Brandys et al. | |
| 10,725,775 B2 | 7/2020 | Suarez et al. | |
| 10,812,582 B2 | 10/2020 | Spillane et al. | |
| 10,915,349 B2* | 2/2021 | Ranjan | G06F 8/60 |
| 10,922,090 B1 | 2/2021 | Lieberman et al. | |
| 11,288,053 B2* | 3/2022 | Myers | G06F 8/60 |
| 2018/0349150 A1* | 12/2018 | Wong | G06F 9/4493 |
| 2019/0042321 A1* | 2/2019 | Venkatesh | G06F 9/45558 |
| 2019/0354389 A1* | 11/2019 | Du | G06F 9/45545 |
| 2020/0082094 A1* | 3/2020 | Mcallister | G06F 8/77 |
| 2020/0356387 A1 | 11/2020 | Anwar et al. | |
| 2021/0004251 A1 | 1/2021 | Skourtis et al. | |
| 2021/0382997 A1* | 12/2021 | Yi | G06F 21/577 |

OTHER PUBLICATIONS

Lorenzo Civolani; Fast Docker Container Deployment in Fog Computing Infrastructures; Anno Accademico 2017/2018; Sessione III; 2017/2018; 93 pages.

* cited by examiner

| Installed Files (Components) | Vendor | Name | Release | Version |
|---|---|---|---|---|
| Active Perl | Active State Software | Active Perl | 5x64 | 5.28.1 2801 x 64 |
| CollabNet Subversion Client | CollabNet | ColabNet Subversion Client | 1x64 | 1.8.3 x 64 |
| Java SE Development Kit | Oracle | Java SE Development Kit | 13(64 bit) | 13.0.1 (64 bit) |
| Tomcat | Apache Software Foundation | Tomcat | 7 | 7.0 |

DOCKER INSTALLED SOFTWARE/HARDWARE DISCOVERY

FIELD

The disclosure relates generally to identification of installed software running on virtualized services and particularly to identification of installed software and hardware using containers.

BACKGROUND

In traditional deployments of applications, the applications on are run physical servers. When virtualization was first introduced, the applications were migrated to run on virtual machines. The next evolution of the virtualization process came with the introduction of containers. Containers are like virtual machines, but because they have relaxed isolation properties to share the Operation System among the applications, containers are faster and more scalable. For traditional and virtual machine deployments, there is a common solution for discovering the installed software/hardware, but this common solution is not applicable to container deployment.

SUMMARY

These and other needs are addressed by the various embodiments and configurations of the present disclosure. A docker image is received. The docker image is for a container. The container contains files that allow for virtualization of applications that run within the container. The docker image is parsed to identify layer files in the docker image. Installed software components (e.g., installed files) and/or hardware components in the layer files are identified. Software application index calls are made to generate information that identifies relationships between the installed software components and/or hardware components. The relationships between the installed software components and/or hardware components are then displayed to a user.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
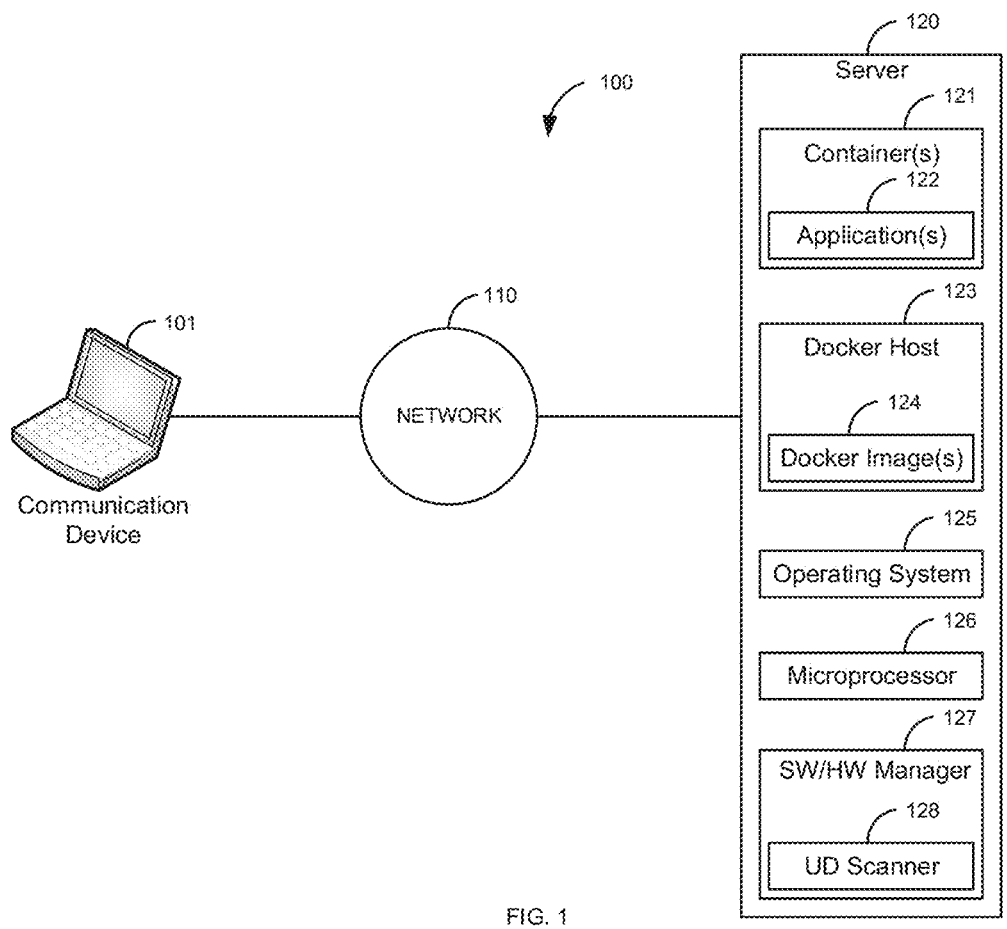
FIG. 1 is a block diagram of a first illustrative system for identifying installed software in a container.

FIG. 1 is a block diagram of a first illustrative system 100 for identifying installed software in a container 121. The first illustrative system 100 comprises a communication device 101, a network 110, and a server 120.

The communication device 101 can be or may include any device that can communicate with the server 120, such as a Personal Computer (PC), a cellular telephone, a Personal Digital Assistant (PDA), a tablet device, a notebook device, a smartphone, and/or the like. Although only a single communication device 101 is shown in FIG. 1, any number of communication devices could be connected to the network 110. In one embodiment, the communication device 101 may not be needed. In this embodiment, a user can access the server 120 directly via a user interface/display that is part of the server 120.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any hardware coupled with software that can run containerized services, such as, a web service, a cloud service, a network service, a security service, a database service, a network management service, and/or the like. The server 120 comprises container(s) 121, a docker host 123, an operating system 125, a microprocessor 126, and a software/hardware manager 127.

The container(s) 121 are a grouping of software packages/applications 122/dependencies that can run quickly and reliably between computing environments. The container(s) 121 are similar to virtual machines, but the container(s) 121 have relaxed isolation properties that allow the container(s) 121 to run faster and more efficiently than virtual machines. The container(s) 121 comprise one or more applications 122. The applications 122 can be, or may include, any application 122, such as, a security application, a database application, a web application, a network application, a gaming application, and/or the like.

The docker host 123 is a process that manages one or more containers 121 that are running on the server 120. The docker host 123 manages the deployment, management, and tear-down of the containers 121. The docker host 123 further comprise one or more docker images 124. A docker image 124 is a template that contains information for creating a container 121 that can be run by the docker host 123. The docker image 124 contains files (i.e., software/hardware components) of the applications 122 and preconfigured execution environments for the docker host 123.

The operating system 125 can be or may include any type of operating system that can support containerized services, such as, a distributed operating system, a network operating system, a multi-tasking operating system, a time-sharing operating system, a general purpose operating system, and embedded operating system, and/or the like. The operating system 125 be a Microsoft Windows™ operating system, a Linux™ operating system, an Android™ operating system, an Apple™ iOS operating system, and/or the like.

The microprocessor 126 can be any hardware microprocessor 126 that can execute the operating system 125, such as, a microcontroller, a multi-core processor, an application specific processor, and/or the like. The microprocessor 126 is used to execute instructions for running the operating system 125, the docker host 123, the container(s) 121, the application(s) 122, the software/hardware manager 127, and the UD scanner 128. In addition to the microprocessor 126, there may be other hardware components, such as network interface cards, graphics processors, video processors, input ports (e.g., USB ports), and/or the like.

The software/hardware manager 127 can be or may include any software coupled with hardware that can manage and identify installed software that installed in the container(s) 121 and/or hardware. The software/hardware manager 127 further comprises a Universal Discovery (UD) scanner 128. The UD scanner 128 is used to scan/parse the docker image(s) 124 to identify installed software in the container(s) 121 and hardware components.

Figure 2:
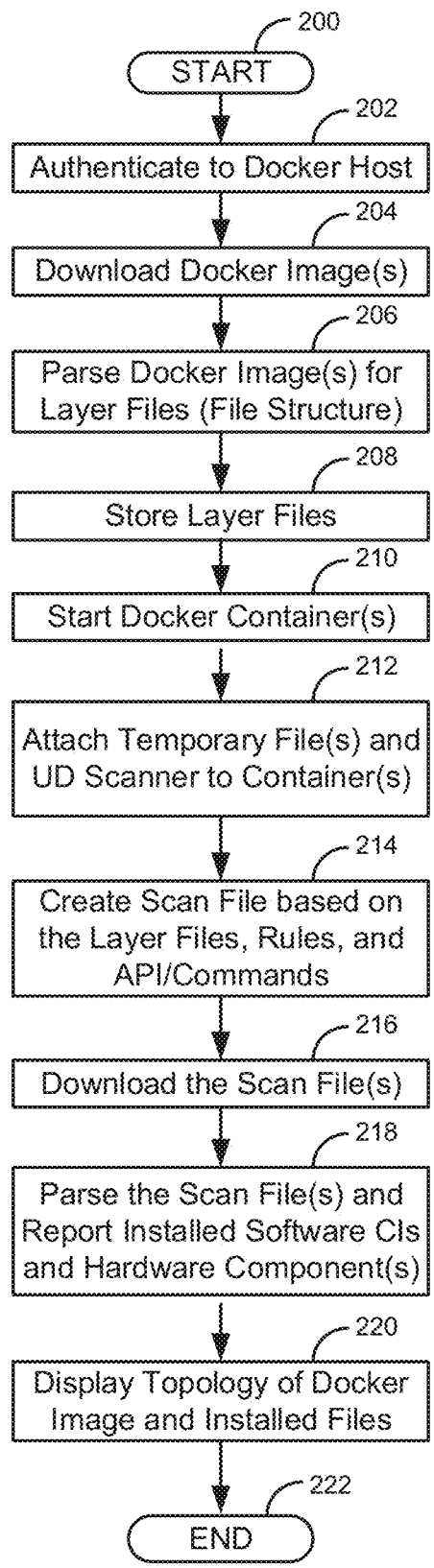
FIG. 2 is a flow diagram of a first embodiment for identifying installed software in a container and hardware used by the container.

FIG. 2 is a flow diagram of a first embodiment for identifying installed software in a container 121 and hardware used by the container 121. Illustratively, the communication device 101, the server 120, the container(s) 121, the application(s) 122, the docker host 123, the docker image(s) 124, the operating system 125, the software/hardware manager 127, and the UD scanner 128 are stored-program-controlled entities, such as a computer or microprocessor 126, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The a user (e.g., at the communication device 102) authenticates to the docker host 123 in step 202. For example, the user, via the communication device 101, authenticates to the docker host 123 using a secure shell protocol. Once authenticated, the software/hardware manager 127 (i.e., executed by the user) downloads the docker image(s) 124. For example, the software/hardware manager 127 uses a docker pull {docker_image_id} command to download the docker image(s) 124. There may be multiple docker images 124 that run in different containers 121.

To further illustrate an exemplary docker image 124 is shown below.

```
# docker inspect
tomcat@sha256:28ee679749012a92b570b699d846eb4b5afabf1b73dc8888acded4216cd5
9f99
[
    {
        "Id":
"sha256:35064a4fcc938b0fd36e05867771cb3024d9fedf1ff2355b53c059c5fd883a1d",
        "RepoTags": [
            "tomcat:latest"
        ],
        "RepoDigests": [
"tomcat@sha256:28ee679749012a92b570b699d846eb4b5afabf1b73dc8888acded4216cd
59f99"
        ],
        "Parent": " ",
        "Comment": " ",
        "Created": "2020-11-03T02:35:55.198836279Z",
        ......
        "GraphDriver": {
            "Data": {
                "LowerDir":
"/var/lib/docker/overlay2/3b5779be1ef4468808911e9c353ff459dbdd5a6aa9c3d243a8
604800fb8e41c7/diff:/var/lib/docker/overlay2/8840b7cf87d03c3a15a19a5803ae3f953f
afced98a2a9442c890493bdad9677a/diff:/var/lib/docker/overlay2/dc5804e9ca708671a
eaccdb8e0740fef9ff0d9e6361c0acdc88621a45df9c441/diff:/var/lib/docker/overlay2/d
c91b3e26f247808f2946b1df46fb7860866e1959f8b39af9ef37c859ff62136/diff:/var/lib/
docker/overlay2/4a033da892ab6a993985b17937c0f34736bd13066328f9f1b8ee0ac9fa
b5dd5a/diff:/var/lib/docker/overlay2/2b97071284216a1aac375a205bdbca5b64b1754
d29d25794fbba5831c4ef7627/diff:/var/lib/docker/overlay2/478ee845778c765a3133eb
59ff5e3f3bb59e4c7478a23fccf9df5096076c7d0e/diff:/var/lib/docker/overlay2/2d2153
5bcc27591bd504e2ad59368d7c2a1f7047fbdc22ed0277f32f458d097f/diff:/var/lib/dock
er/overlay2/10fe2eaafddf05ed1a8e0f5cbc60a8b708c4f3ce9369fe90aab372109853a19f/
diff",
                "MergedDir":
"/var/lib/docker/overlay2/4f36fa9d999070b12dd8335922dcd43251398a27af16cd7e3285
5eb464051e14/merged",
                "UpperDir":
"/var/lib/docker/overlay2/4f36fa9d999070b12dd8335922dcd43251398a27af16cd7e32
855eb464051e14/diff",
                "WorkDir":
"/var/lib/docker/overlay2/4f36fa9d999070b12dd8335922dcd43251398a27af16cd7e3285
5eb464051e14/work"
            },
            "Name": "overlay2"
        },
        "RootFS": {
            "Type": "layers",
            ......
        },
        "Metadata": {
            "LastTagTime": "0001-01-01T00:00:00Z"
        }
    }
]
```

The software/hardware manager 127 parses, in step 206, the docker image(s) 124 for layer files and hardware information. The software/hardware manager 127 retrieves the layer files of a specific docker image 124 by using a docker inspect command on the docker host 123. The layer files are stored in the LowerDir and UpperDir sections (highlighted above in the exemplary docker image 124) of the docker image 124. The layer files identify specific installed files (i.e., software components) and/or hardware components that are used in the container 121 along with the file structure for the installed files in the container 121. The layer files are then stored in a temporary file in step 208.

The container(s) 121 are started in step 210. The temporary file(s) and the UD scanner 128 are attached to the container(s) 121 in step 212. For example, if there are multiple container(s) 121, each respective container 121 will have an associated temporary file and a UD scanner 128 that are attached to the respective container 121. The temporary file(s)/UD scanner 128 may be attached using a docker attach command. Because the temporary file/UD scanner 128 are attached to the container 121, the UD scanner 128 can be executed within the container 121 to display relationships between installed files (software components and/or hardware components) while the container 121 is running.

Figures 4A, 4B:
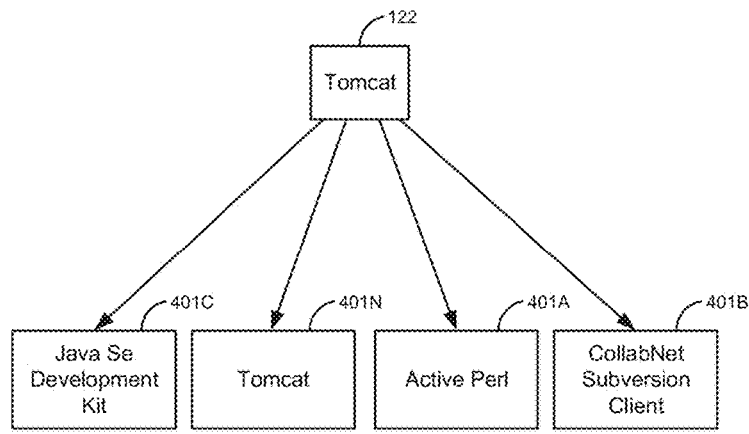
FIG. 4A is a diagram of a display of installed files in a container.
FIG. 4B is a diagram of a display that shows the relationship between an application and installed files in a container.

The UD scanner 128 creates, in step 214, a scan file based on the layer files and hardware components in the temporary file. The UD scanner 128 identifies the installed files in the container 121 from the layer files. The UD scanner 128 makes Software Application Index (SAIs) calls that identify relationships between the installed files (e.g., as shown in FIG. 4B). The SAI are calls that are a non-destructive scan of the docker image 124 in use. The docker image 124 is not instantiated by the SAI calls. If the docker image 124 is instantiated, it can damage the production environment. The process of FIG. 2 is different from the prior art (e.g., as described in U.S. Pat. No. 10,635,406) in that the docker image 124 is not instantiated when identifying the relationships.

The scan file is then downloaded in step 216. The scan file is parsed in step 218. The scan file can be parsed using an Extended Markup Language (XML) parser. The XML parser can recognize the relationships between installed files and hardware components according the installation features. The Configuration Items (CIs, i.e., the relationships) are reported in step 218. The CIs and installed files are used to identify relationships. For example, if software component A is related to software component B and software component B is also related to software component C, then software component A is related to software component C. The topology of the docker image 124, the relationships, and the installed files are displayed based on the Cis (e.g., as shown in FIGS. 4A-4B).

In addition, the relationships between hardware components and software components can be identified. For example, a container 121 may be running on a specific core of a multi-core processor. In addition, the container 121 may be using a network interface card using a specific IP address. The process can also identify relationships between containers. For example, two containers 121 may be using the same network card using different IP addresses.

Figure 3:
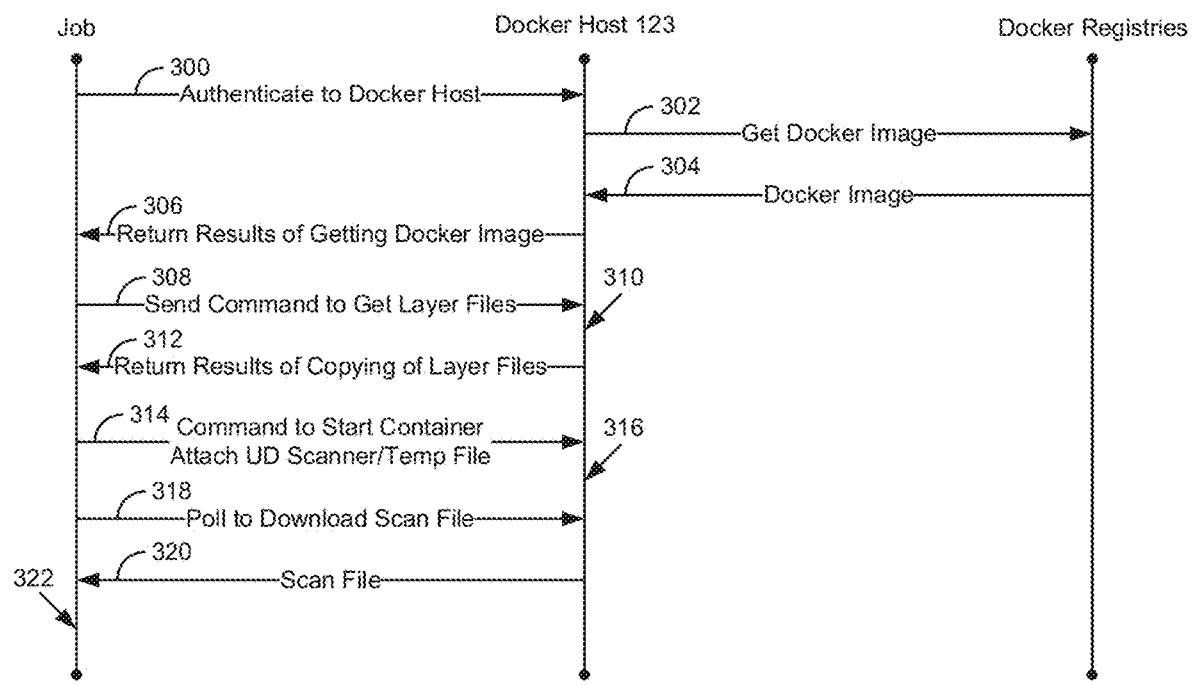
FIG. 3 is a flow diagram of a second embodiment for identifying installed software in a container and hardware used by the container.

FIG. 3 is a flow diagram of a second embodiment for identifying installed software in a container 121 and hardware used by the container 121. A discover job (e.g., the SW manager 127) authenticates to the docker host 123 in step 300. For example, the job authenticates using the Secure Shell (SSH) protocol. The docker host 123 sends, in step 302, a message to get the docker image 124. The docker registries returns in the docker image 124 in step 304. The results of getting the docker image 124 are returned in step 306.

The job sends, in step 308, a command to get the layer files. The docker host 123 parses, in step 310, the layer files and places the layer files into the temporary file. The docker host 123 returns the results of copying the layer files in step 312. The job sends, in step 314, a command to start the container 121 and attach the UD scanner 128/temporary file to the container 121.

Figure 5:
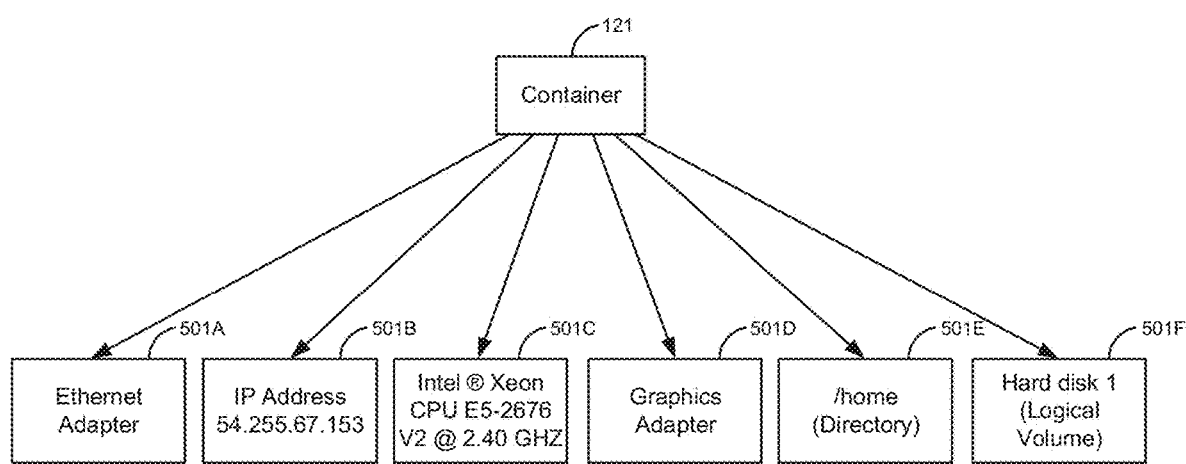
FIG. 5 is a diagram of a display that shows the relationship between a container and hardware components.

The docker host 123 starts the container 121 and runs the UD scanner 128 to scan the layer files of the docker image 124 to generate the scan file in step 316. The job sends, in step 318, a poll to download the scan file. The docker host 123 sends, in step 320, the scan file. The job, in step 322, parses the scan file and return the results (e.g., as shown in FIGS. 4A-4B and FIG. 5).

FIG. 4A is a diagram of a display of installed files 401A-401D (software components) in a container 121. FIG. 4A comprises a list of installed files 400. The list of installed files 400 comprises the installed files 401A-401D. The installed file Active Perl 401A is from the vendor Active State Software, has a name of Active Perl, is release number 5×64, and has a version number of 5.28.1 2801×64. The installed file CollabNet Subversion Client 401B is from the vendor CollabNet, has a name of ColabNet Subversion Client, is release number 1×64, and has a version number of 1.8.3×64. The installed File Java SE Development Kit 401C is from the vendor Oracle, has a name of Java SE Development Kit, has a release number of 13 (64 bit), and has a version number of 13.0.1 (64 bit). The installed file Tomcat 401N is from the Apache Software Foundation, has a name of Tomcat, has a release number of 7, and a version number of 7.0.

The list of installed files 400 is based on the exemplary docker image 124 that is shown above. The list of installed files 400 is an exemplary example of one way of displaying information associated with the installed files 401A-401N. As one of skill in the art would recognize, the list of installed files 400 and types of information displayed may be displayed or organized in various ways, such as in a scrollable list, a menu, a template, and/or the like.

FIG. 4B is a diagram of a display that shows the relationship between an application 122 and installed files 401A-401N in a container 121. The application 122 tomcat uses each of the installed files (e.g., software components) 401A-401N. The SAIs are used to help determine the relationships between the CIs and the installed files as shown in FIG. 4B.

FIG. 5 is a diagram of a display that shows the relationship between a container and hardware components. The container 121 uses Ethernet Adapter 501A, IP Address 54.255.67.153 (501B), Intel® Xeon CPU E5-2676 V2 that runs at 2.40 GHZ (501C), Graphics Adapter 501D, /home directory 501E, and hard disk 1 (a logical volume).

The relationships between hardware and software components may be displayed in various ways. For example, the Intel® Xeon CPU 501C may show specific software components that are running on the Intel® Xeon CPU 501C, such as the Tomcat Application 122 that is running in the container 121.

In addition, relationships between containers 121 may be displayed. For example, two containers 121 may be using different partitions on the same hard disk and/or may be running on the same processor.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   get a docker image, wherein the docker image is for a container that is running;
   parse the docker image to identify layer files in the docker image;
   identifying installed software components and hardware components in the layer files;
   while the container is running, make software application index calls to the docker image to generate information that identifies relationships between the installed software components and hardware components, the software application index calls not instantiating the container associated with the docker image; and
   generate, for display, the relationships between the installed software components and hardware components.

2. The system of claim 1, wherein the docker image and the generated information are not based on an instantiated container, wherein the container comprises a plurality of containers and wherein the microprocessor attaches, to a corresponding container of the plurality of containers, a temporary file identifying a layer file and a hardware component used by the corresponding container, wherein different containers of the plurality of containers correspond to different temporary files.

3. The system of claim 2, wherein the attachment of the temporary file to the corresponding container enables a universal discovery ("UD") scanner to be executed within the corresponding container while the corresponding container is running and wherein the microprocessor readable and executable instructions further cause the microprocessor to:
   authenticate to a docker host to get the docker image; and
   create a scan file by the UD scanner based on the layer files and hardware components identified in the temporary file.

4. The system of claim 1, wherein the microprocessor readable and executable instructions further cause the microprocessor to:
   store the layer files in a temporary file;
   attach the temporary file to the container;
   attach a universal discovery scanner to the container; and
   execute the universal discovery scanner in the container to generate the information that identifies the relationships between the installed software components and hardware components.

5. The system of claim 3, wherein the docker image comprises a plurality of docker images and wherein the generated information for display is based on the plurality of docker images running on the plurality of containers and wherein a parser parses the scan file to generate the information that identifies the relationships between the installed software components and hardware components.

6. The system of claim 5, wherein the generated information contains installed software in the container and one or more hardware components that are used by the container and wherein the generated information identifies relationships between different containers.

7. The system of claim 1, wherein the microprocessor readable and executable instructions further cause the microprocessor to:
   generate, for display, the installed software components and hardware components.

8. A method comprising:
   getting, by a microprocessor, a docker image, wherein the docker image is for a container that is running;
   parsing, by the microprocessor, the docker image to identify layer files in the docker image;
   identifying, by the microprocessor, installed software components and hardware components in the layer files;
   while the container is running, making, by the microprocessor, software application index calls to the docker image to generate information that identifies relationships between the installed software components and hardware components, the software application index calls not instantiating the container associated with the docker image; and
   generating, by the microprocessor, for display, the relationships between the installed software components and hardware components.

9. The method of claim 8, wherein the docker image and the generated information are not based on an instantiated container, wherein the container comprises a plurality of containers and further comprising attaching, to a corresponding container of the plurality of containers, a temporary file identifying a layer file and a hardware component used by the corresponding container, wherein different containers of the plurality of containers correspond to different temporary files.

10. The method of claim 9, wherein the attachment of the temporary file to the corresponding container enables a universal discovery ("UD") scanner to be executed within the corresponding container while the corresponding container is running and further comprising:
    authenticating to a docker host to get the docker image; and
    creating a scan file by the UD scanner based on the layer files and hardware components identified in the temporary file.

11. The method of claim 8, further comprising:
    storing the layer files in a temporary file; attaching the temporary file to the container;
    attaching a universal discovery scanner to the container; and
    executing the universal discovery scanner in the container to generate the information that identifies the relationships between the installed software components and hardware components.

12. The method of claim 10, wherein the docker image comprises a plurality of docker images and wherein the generated information for display is based on the plurality of docker images running on the plurality of containers and further comprising parsing the scan file to generate the information that identifies the relationships between the installed software components and hardware components.

13. The method of claim 12, wherein the generated information contains installed software in the container and one or more hardware components that are used by the container and wherein the generated information identifies relationships between different containers.

14. The method of claim 8, further comprising: generating, for display, the installed software components and hardware components.

15. A non-transient computer readable medium having stored thereon instructions that cause a processor to:
get a docker image, wherein the docker image is for a container;
parse the docker image to identify layer files in the docker image;
identify installed software components and hardware components in the layer files, wherein, in identifying the installed software components and hardware components in the layer files, further cause the processor to:
store the layer files in a temporary file;
attach the temporary file to the container;
attach a universal discovery scanner to the container;
execute the universal discovery scanner in the container to
generate information that identifies relationships between the installed software components and hardware components;
make software application index calls to generate the information that identifies the relationships between the installed software components and hardware components; and
generate, for display, the relationships between the installed software components and hardware components.

16. The non-transient computer readable medium of claim 15, wherein the docker image and the generated information are not based on an instantiated container.

17. The non-transient computer readable medium of claim 15, wherein the container comprises a plurality of containers and further comprising attaching, to a corresponding container of the plurality of containers, the temporary file identifying the layer file and a hardware component used by the corresponding container, wherein different containers of the plurality of containers correspond to different temporary files.

18. The non-transient computer readable medium of claim 15, wherein the docker image comprises a plurality of docker images and wherein the generated information for display is based on the plurality of docker images running on a plurality of containers.

19. The non-transient computer readable medium of claim 15, wherein the generated information contains installed software in the container and one or more hardware components that are used by the container.

20. The non-transient computer readable medium of claim 15, wherein further cause the processor to:
generate, for display, the installed software components and hardware components.

* * * * *